United States Patent [19]
Blackstock et al.

[11] 3,944,279
[45] Mar. 16, 1976

[54] HUNTER'S SEAT

[76] Inventors: Billy J. Blackstock, 1858 Belmont Blvd., Abilene, Tex. 79602; Truman D. Adkisson, Rte. 1, Box 104A, Tuscola, Tex. 79562

[22] Filed: Mar. 5, 1975

[21] Appl. No.: 555,389

[52] U.S. Cl............ 297/217; 248/221 C; 248/397; 297/314
[51] Int. Cl.²......................................... A47C 7/62
[58] Field of Search .......... 248/221, 228, 230, 397, 248/398; 297/217, 314, 326–328, 363, 364, 376, 257, 240–242

[56] References Cited
UNITED STATES PATENTS

| | | | |
|---|---|---|---|
| 882,983 | 3/1908 | Wentworth | 248/397 |
| 1,677,434 | 7/1928 | Dorton | 297/456 X |
| 1,808,196 | 6/1931 | Williams | 248/230 X |
| 2,252,137 | 8/1941 | Rummerfield | 297/241 |
| 2,711,783 | 6/1955 | Prill | 248/221 X |
| 2,833,367 | 5/1958 | Pool et al. | 297/217 X |
| 2,855,980 | 10/1958 | Konieczka | 248/221 |
| 3,313,514 | 4/1967 | Swett | 108/153 X |

*Primary Examiner*—James C. Mitchell
*Attorney, Agent, or Firm*—Arthur F. Zobal

[57] ABSTRACT

The specification discloses a seat adapted to be attached to a tree for use by hunters. The seat comprises a seat member having its bottom rotatably coupled to the top end of a pole or rod whose bottom end is pivotally coupled to a plate for pivotal movement about a pivot point. The plate is attached to a clamp of two clamping members employed for clamping the seat to the limb of a tree. A plurality of holes are formed in the plate in a 90° arcuate pattern whose center is the pivot point where the bottom end of the rod is pivotally coupled to the plate. The rod has an aperture formed therethrough for alignment with each of the holes formed through the plate whereby the rod and hence the seat member may be attached with a bolt or the like to the plate at any point along the 90° arc formed by the holes.

6 Claims, 2 Drawing Figures

HUNTER'S SEAT

BACKGROUND OF THE INVENTION

This invention relates to a portable hunter's seat and more particularly to a rotatably supported seat which may be attached to the limb of a tree and supported in a horizontal position whether the limb is horizontal or at an angle.

Different types of hunter's seats for attachment to a tree have been proposed, however, those known are not rotatably supported and must be attached to a vertical trunk or post in order to maintain the seat horizontal. Such seats have disadvantages for hunters, such as archery hunters, who must have free movement to effectively allow the hunter to hit the sought after game. Moreover, in many areas, where only brush type trees exist, such as mesquite trees, there generally are no vertical trunks, thereby rendering the prior art seats ineffective.

SUMMARY OF THE INVENTION

It is an object of the present invention to provide a portable hunter's seat having a rotatably supported seat member and which may be attached to a vertical post or tree trunk or to a horizontal or angularly disposed limb with the seat members supported in the horizontal position.

The seat comprises an elongated support member having top and bottom ends; a seat member having its bottom rotatably coupled to the top end of said support member; two clamp members having inner sides adapted to engage the limb of a tree or the like; and adjustable means for coupling said clamp members together with their inner sides in engagement with a post or with the limb of a tree or the like for clamping the clamp members to the post or to the tree. Plate means is fixedly connected to the outer side of one of the clamp members. A plurality of spaced holes are formed through the plate member in an arcuate pattern. Means is provided for pivotally coupling the bottom end of the elongated member to the plate member at the center point of the arcuate pattern to allow the support member to be pivoted to different angular positions in an arcuate path next to the spaced holes. The support means has an aperture formed therethrough at a distance from the center point equal to the distance between the plurality of spaced holes and the center point such that the aperture may be aligned with each of the plurality of holes formed through the plate means when the support means is moved next to a selected one of the plurality of holes. In addition, holding means is adapted to be inserted through the aperture and a selected one of the plurality of holes when in alignment with said aperture for adjustably securing said support means and hence said seat member in a given position relative to said plate means to support said seat member in a generally horizontal plane.

In another aspect, the clamp members each comprise U-shaped portions. The inner sides of the U-shaped portions of the clamp members are adapted to fit around a portion of a post or the limb of a tree for engagement therewith. The plate means has an edge connected to the outer side of the U-shaped portion of said one clamp member.

In another aspect, the plane of the plate means coincides with a plane bisecting the U of the U-shaped portion of said one clamp member. The holes formed through the plate means are formed along an arcuate pattern defining an angle of about 90° relative to said center point.

DETAILED DESCRIPTION OF THE INVENTION

Figure 1:
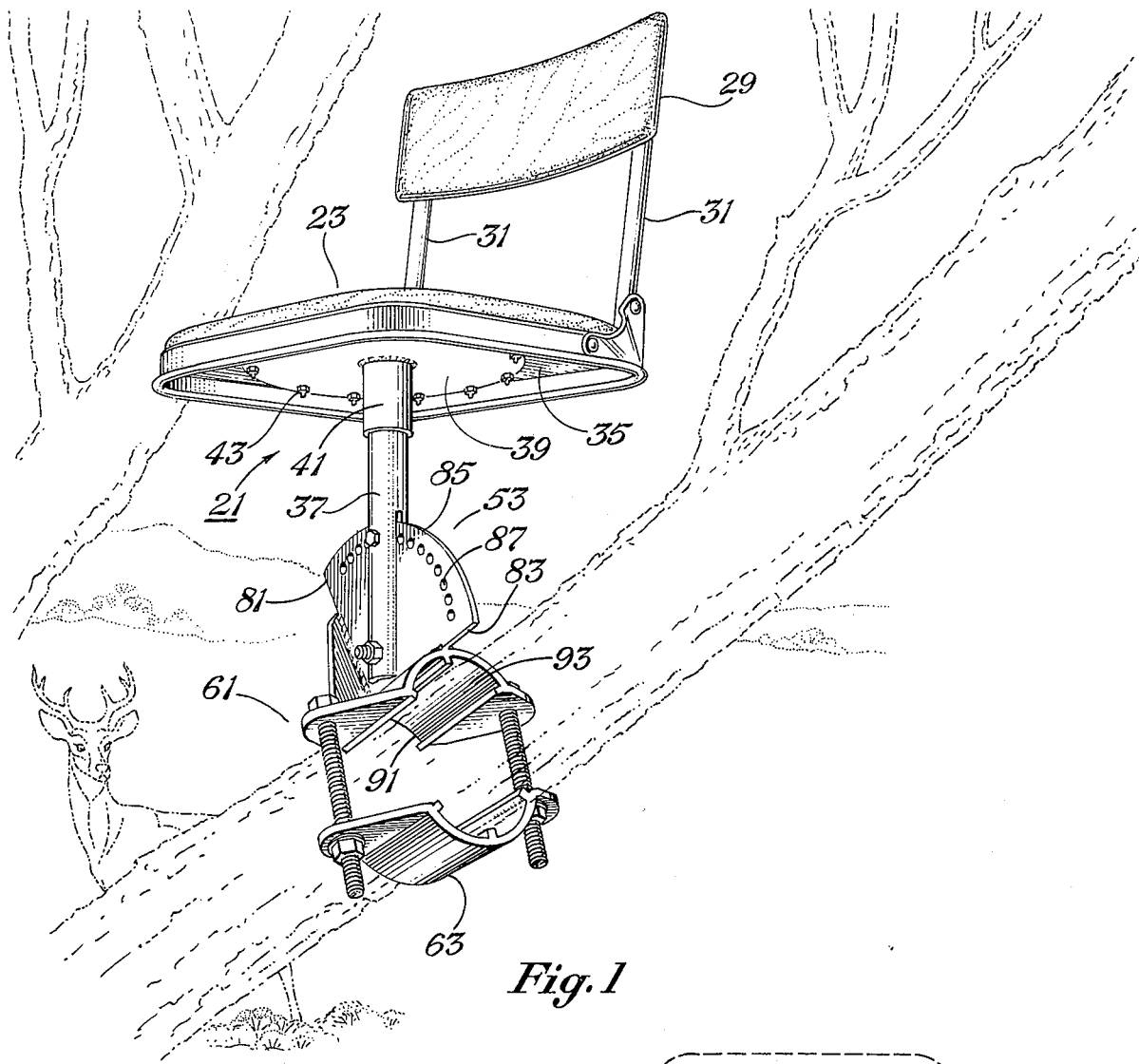
FIG. 1 illustrates the hunter's seat attached to the limb of a tree.
Figure 2:
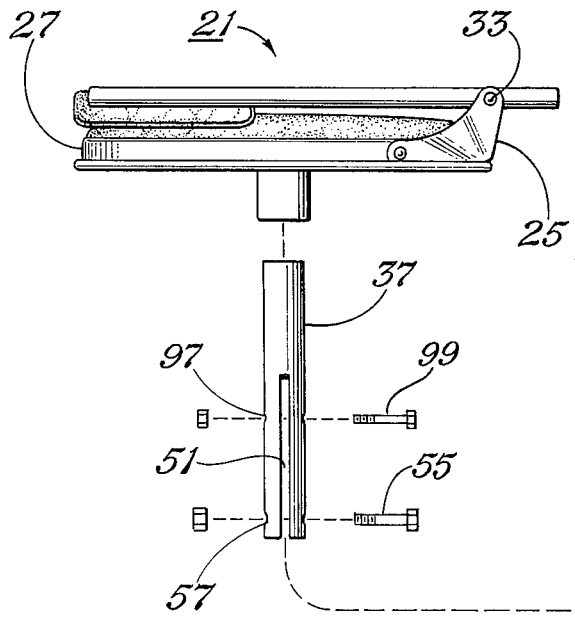
FIG. 2 is an exploded view of the seat of FIG. 1.
Figure 2:
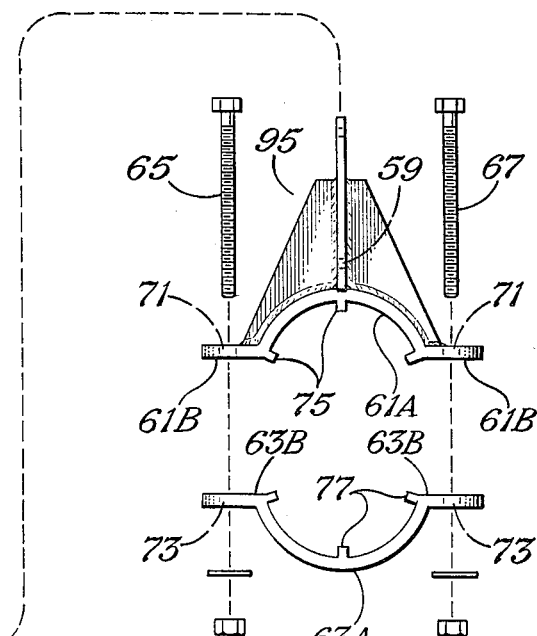

Referring to FIGS. 1 and 2, the seat of the present invention is identified at 21. It comprises a seat member 23 having brackets 25 connected to a base 27 for pivotally supporting a back 29. The back 29 has two arms 31 which are pivotally coupled to brackets 25 by pins 33 whereby the back may be located in a supporting position, as illustrated in FIG. 1 or in a folded position, as illustrated in FIG. 2.

The bottom 35 of the seat assembly 23 is rotatably coupled to the top end of an elongated support or rod 37 by way of a disc 39 and a cylindrical member 41 connected to and extending downward from the disc. The disc 39 is connected to the bottom 35 by way of bolts 43, while the cylinder 41 is fitted around the top end of the rod 37 such that the seat 23 may be rotated 360°.

The lower portion of the rod 37 has a slot 51 formed therethrough into which is fitted a plate 53. The lower end of the rod is pivotally coupled to the plate 53 by way of a bolt 55 which extends through an aperture 57 formed through the rod and through an aperture 59 formed through the plate. The plate 53 is fixedly connected to a clamp member 61 of a pair of clamping members 61 and 63 which are adapted to be clamped around the limb of a tree, as illustrated in FIG. 1 or around a vertical post. Clamp 61 comprises a U-shaped portion 61A having two tabs 61B extending outward from the lower edges thereof. Similarly, clamp 63 comprises a U-shaped portion 63A having two tabs 63B extending outward from the lower edges thereof. The insides of the U-shaped portions 61A and 63A are adapted to be fitted around a limb or post whereby the members 61 and 63 may be securely clamped to the limb or post by way of bolts 65 and 67 inserted through apertures 71 and 73 formed through the tabs 61B and 63B of the clamps. The U-shaped portions 61A and 63A also have projections 75 and 77 extending inward for biting into the limb or post in order to insure a better grip and to prevent the clamp from rotating.

The plate 53 has two straight edges 81 and 83 which define an angle of about 90°. It also has an arcuate edge 85 which joins the edges 81 and 83. Formed through the plate 53 inward of the edge 85 are a plurality of spaced holes 87 which define an arc of about 90° relative to aperture 59 and bolt 55. The edge 81 of the plate is welded to the top of the U-shaped portion 61A along its length between ends 91 and 93 such that the plate 53 and the U-shaped portion 61A form an inverted "Y" or wishbone, as seen in FIG. 2. The plane of the plate 53 coincides with the plane bisecting the "U" of the U-shaped portion 61A. A bracket 95, having a circular edge is welded to the end of U-shaped portion 61A and to the edge 81 of the plate 53 for support purposes.

Formed through the rod 37 is another aperture 97. The distance between apertures 97 and 57 is equal to the distance between the holes 87 and aperture 59 whereby the aperture 97 may be aligned with each of the holes 87 along the 90° arc formed by the holes 87 when the support 37 is pivoted from one edge 81 to the other edge 83 of the plate 53. A bolt 99 is provided for its insertion through the aperture 97 and a selected one of the holes 87 of the plate 53 for fixedly attaching the support rod and hence the seat member 23 to the plate 53 at a desired angular position relative to the plate 53 to locate the seat member 23 in a horizontal plane. With this arrangement, the clamp defined by members 61 and 63, may be attached to an inclined branch or tree limb as illustrated in FIG. 1 and the proper hole 87 selected to locate the rod 37 in a vertical position and hence the seat member 23 in a horizontal plane. If the tree branch is a horizontal branch, then the support 37 will be positioned next to the edge 81 to allow the bolt 99 to extend through the hole 87 next to the edge 81 to allow the bolt 99 to extend through the hole 87 next to the edge 81 to position the rod 37 in a vertical position to locate the seat member 23 in a horizontal plane. For branches which are inclined at greater angles than that shown in FIG. 1, the rod 37 will be moved toward the edge 83 and the proper hole 87 selected to position the rod 37 vertically and hence the plane of the seat 23 horizontally. As can be understood, the clamp may be attached to the top of a vertical post with the rod 37 located vertically and hence the seat member 23 in a horizontal plane by positioning the rod 37 next to the edge 83 to allow the hole 37 next to the edge 83 to be employed for securing the rod in place.

We claim:

1. A seat adapted to be attached to a tree or the like, for use by hunters or the like comprising:

an elongated support member having top and bottom ends, a seat member having its bottom rotatably coupled to the top end of said support member, two clamp members having inner sides adapted to engage the limb of a tree or the like, adjustable means for coupling said clamp members together with their inner sides in engagement with the limb of a tree or the like for clamping said clamp members to the tree, plate means fixedly connected to the outer side of one of said clamp members, a plurality of spaced holes formed through said plate member in an arcuate pattern, means for pivotally coupling the bottom end of said elongated support member to said plate at the center point of said arcuate pattern to allow said support member to be pivoted to different angular positions in an arcuate path next to said spaced holes, said support member having an aperture formed therethrough at a distance from said center point equal to the distance between said plurality of spaced holes and said center point such that said aperture may be aligned with each of said plurality of holes formed through said plate means when said support member is moved next to a selected one of said plurality of holes, and holding means adapted to be inserted through said aperture and a selected one of said plurality of holes when in alignment with said aperture for adjustably securing said support member and hence said seat member at a given position relative to said plate means to support said seat member in a generally horizontal plane.

2. The seat of claim 1 wherein:

said clamp members each comprise U-shaped portions, the inner sides of the U-shaped portions of said clamp members being adapted to fit around a portion of the limb of a tree for engagement therewith, said plate means having an edge connected to the outer side of the U-shaped portion of said one clamp member.

3. The seat of claim 2 wherein the plane of said plate means coincides with a plane bisecting the "U" of the U-shaped portion of said one clamp member.

4. The seat of claim 3 wherein said holes formed through said plate means along said arcuate pattern define an angle of about 90° relative to said center point.

5. The seat of claim 4 wherein the inner side of said U-shaped portions of said clamp members have inward projecting means for biting into the limb of a tree when the inner sides of said clamp members are fitted around the limb of a tree.

6. The seat of claim 4 wherein:

said plate means is defined by two straight edges about 90° with respect to each other and an arcuate edge joining said straight edges, one of said straight edges being connected to the outer side of the U-shaped portion of said one clamp member.

* * * * *